United States Patent [19]
Thelen et al.

[11] Patent Number: 5,094,339
[45] Date of Patent: Mar. 10, 1992

[54] POCKET PLATE

[75] Inventors: Brian L. Thelen, Fond du Lac; Michael A. Balz, Kiel, both of Wis.

[73] Assignee: Nigrelli Systems, Inc., School Hill, Wis.

[21] Appl. No.: 640,895

[22] Filed: Jan. 14, 1991

[51] Int. Cl.⁵ .............................................. B65G 47/04
[52] U.S. Cl. ................................ 198/484.1; 198/600; 198/637; 198/803.1; 198/803.13
[58] Field of Search ...................... 198/484.1, 600, 635, 198/637, 803.1, 803.13

[56] References Cited

U.S. PATENT DOCUMENTS

| | | |
|---|---|---|
| 784,622 | 3/1905 | Lindemann et al. ........ 198/803.13 X |
| 958,252 | 5/1910 | Jenkins ............................ 198/803.1 |
| 2,552,101 | 5/1951 | Lisch, Jr. et al. ................. 198/484.1 |
| 2,889,032 | 6/1959 | Trower ............................ 198/803.1 |
| 3,342,310 | 9/1967 | Gray ................................ 198/803.1 |
| 3,439,520 | 4/1969 | Schwartz ...................... 198/803.1 X |
| 3,598,229 | 8/1971 | Spycher ........................ 198/803.1 X |
| 3,809,210 | 5/1974 | Anderson ......................... 198/803.1 |
| 4,290,519 | 9/1981 | Harvey ........................... 198/635 X |
| 4,821,869 | 4/1989 | Hodlewsky ..................... 198/635 X |

FOREIGN PATENT DOCUMENTS

| | | |
|---|---|---|
| 944378 | 3/1974 | Canada ............................. 198/484.1 |
| 2201648 | 10/1978 | Fed. Rep. of Germany ........................ 198/803.13 |

Primary Examiner—D. Glenn Dayoan
Attorney, Agent, or Firm—Francis J. Bouda

[57] ABSTRACT

A multi-part tray is provided to carry a plurality of objects in precise and accurate array through a process device. The tray parts are each fastened to a flexible plate and also to a conveyor. The conveyor is caused to travel a circuitous route around convex curves which thereupon splay the tray parts apart beneath a loading station and also beneath an unloading station where the objects are slidably moved onto or removed form the tray. A plurality of loading and unloading fingers slide in corresponding grooves in the bottoms of the tray-parts and beneath the objects.

13 Claims, 4 Drawing Sheets

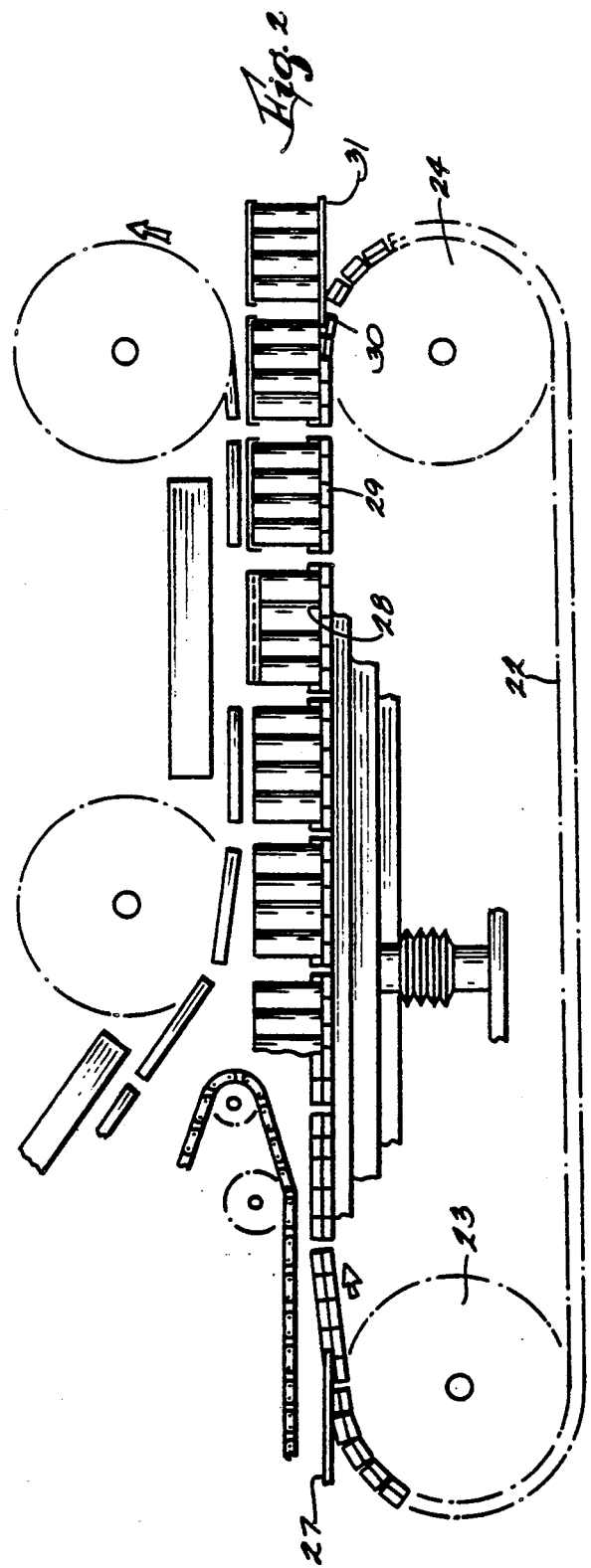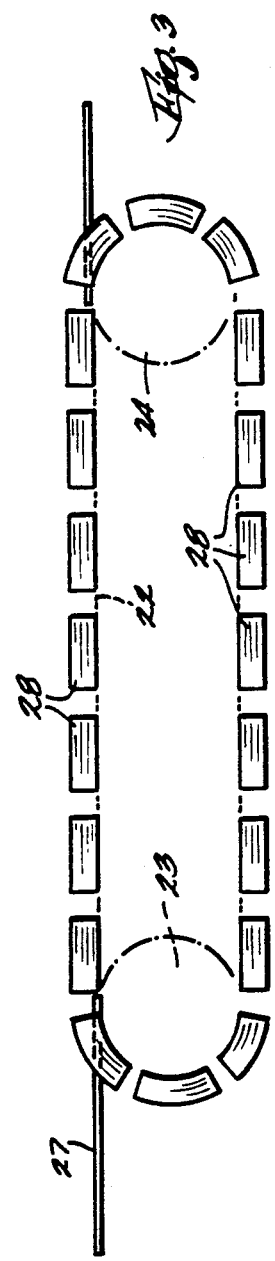

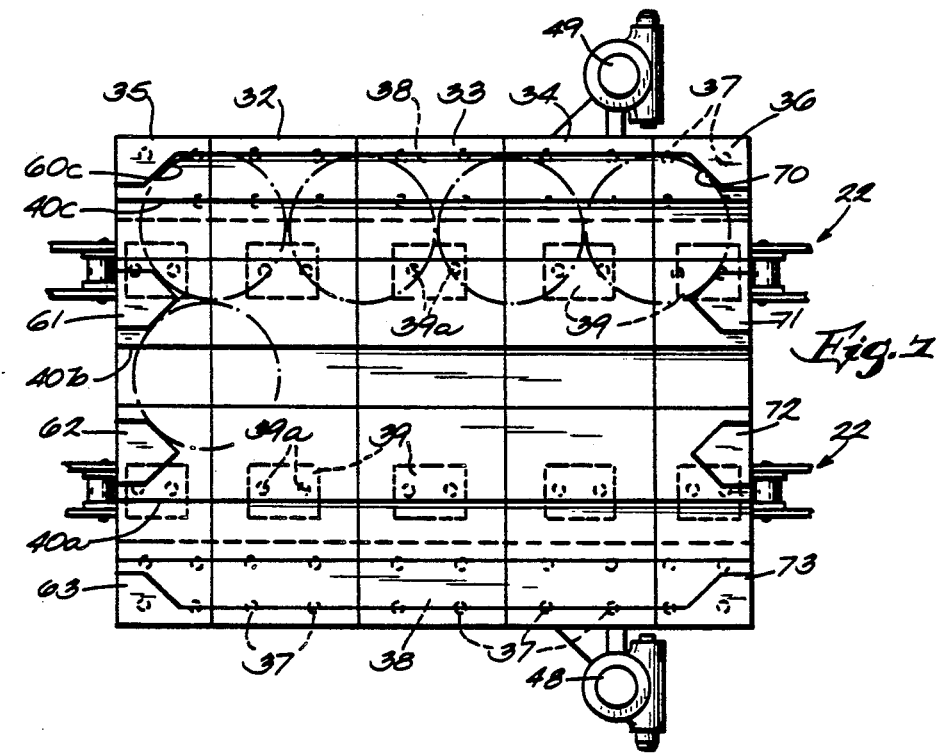
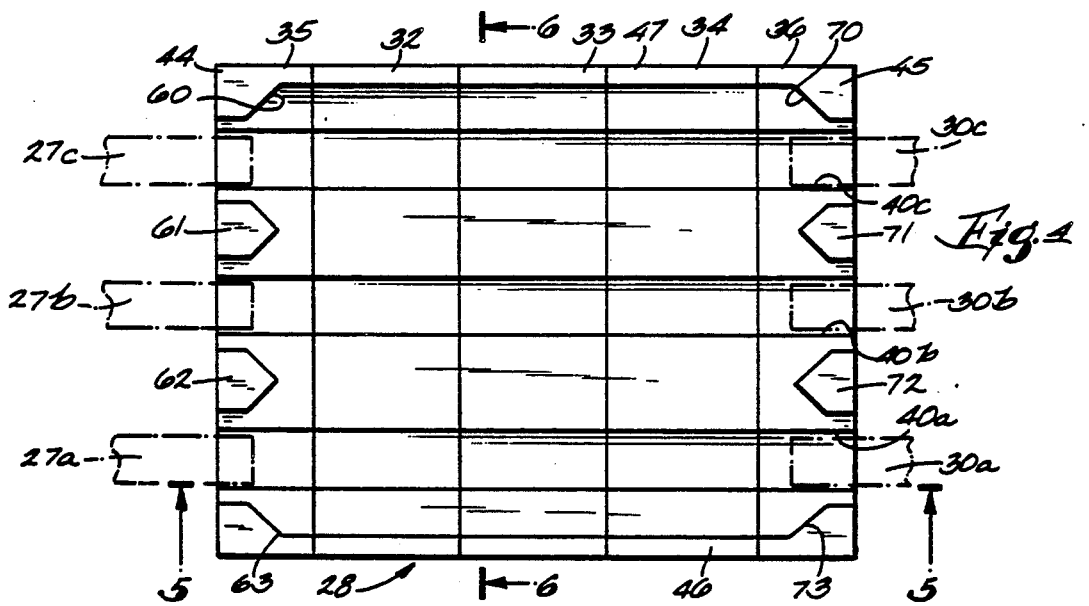
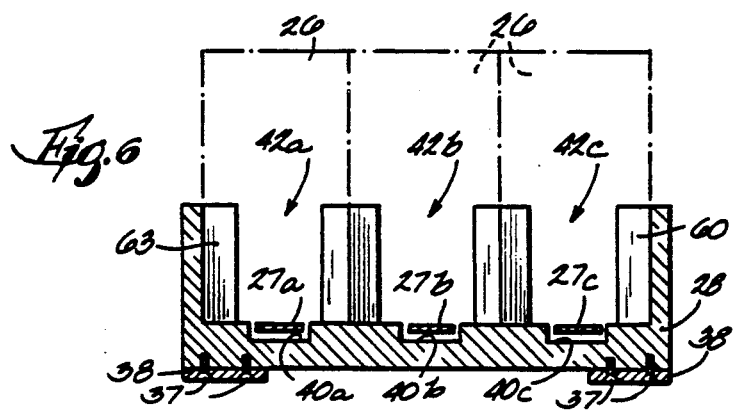

POCKET PLATE

BACKGROUND OF THE INVENTION

In many process and manufacturing devices, particularly where a plurality of items must be assembled and transported and carefully aligned, it is critical that the items be rapidly collected, assembled, aligned, retained in fixed position, and transported through a process device which quite often includes the delicate and precise matching of a secondary operating feature in connection with the products carried through the machinery and for which the process is applicable.

Such a process and apparatus is often seen in the container-filling and transporting devices, such as for soft drink containers, cans and bottles, milk bottles, wine, and beer bottles and cans, etc. More specifically, such processing apparatus is disclosed and described in my co-pending application Ser. No. 07/617,685.

The invention of this present application is an improvement in the carrier, transporting and retaining devices of the prior art, and more clearly and specifically describes the pocket plates referred to in application Ser. No. 617,685.

OBJECTS OF THE INVENTION

One object of the present invention is to provide a carrier device for a plurality of similar containers, which will hold a multiple of such devices in precise registry through a processing machine while aspects of the process are performed upon the objects.

A further object of the present invention is to provide a carrier for a plurality of objects, which carrier can be transported around a continuous loop for repetitive utilization, which carrier is flexible in turning around turning devices, but which is rigid and stable when in a carrier-containing mode.

Still a further object is to provide a device for holding variety of products in accurate location for subsequent operation upon such products.

A more specific object of the present invention is to provide a carrier mechanism for a plurality (as many as a dozen) of beverage cans in a carrier-applying process.

SUMMARY OF THE INVENTION

In the present invention, a plurality of flat, flexible plates are secured to a conveyor such as a chain-type conveyor, each plate being sufficiently large to support a desired number of objects thereon, as, for instance, 12 cans of a beverage product.

A plurality of retaining devices, generally U-shaped in cross-section, are mounted upon each plate, individually but in close contact with each other. The end retaining-devices also have a shoulder between the upstanding legs of the "U".

The retaining devices, which may be five in number to support an array of 12 beverage cans, and mounted on the flexible metal plate, provide a "pocket" for securely, tightly, and accurately holding the items in place while being further transported along the conveyor belt.

The carrier chain is transported by gears and sprockets along a desired path so that the containers may be slidably inserted therein, the pocket closed into position, and when the pocket reaches the end of the processing array, the conveyor chain moves around another sprocket, opening the pocket and discharging the containers onto an off-loading or receiving device.

The bottom portion of each of the members forming the pocket includes one or more grooves into which the loading and unloading fingers on which the items arrive and are discharged can travel.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

FIG. 2 is a more detailed view of the apparatus of FIG. 1, similar to FIG. 7 of application Ser. No. 617,685.

FIG. 3 is a schematic drawing of 20 of the pocket plates of the present invention arranged on a carrier chain.

FIG. 4 is a top plan view of one of the pocket plate assemblies of the present invention.

FIG. 6 is a vertical cross-sectional view taken along line 6—6 of FIG. 4.

FIG. 7 is a view, similar to that of FIG. 4, showing how the pocket plate members are assembled to the conveyor carrier chain.

Figure 1:
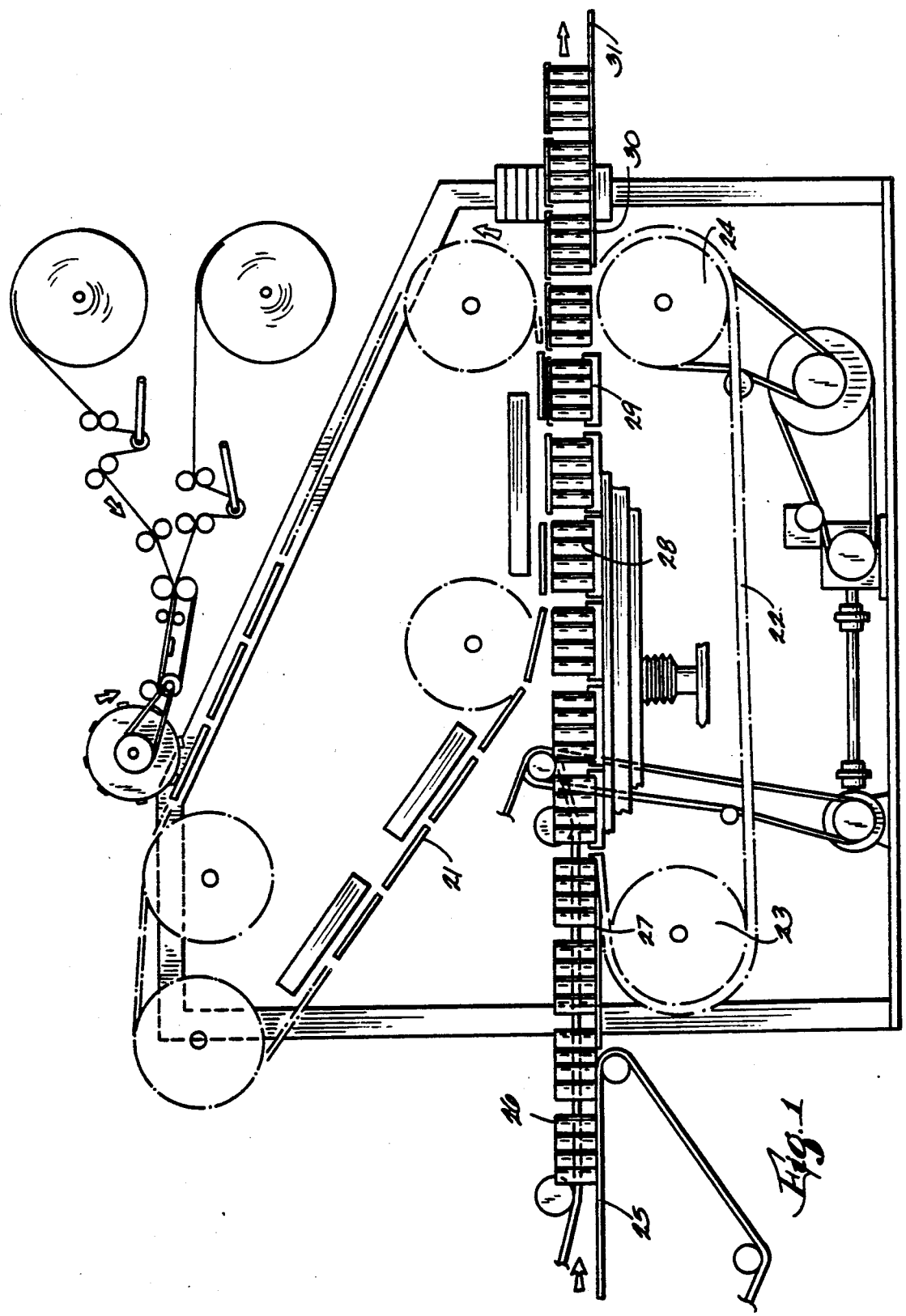
FIG. 1 is a side elevational view, similar to FIG. 5 of application Ser. No. 617,685 of an assembly machine for applying sanitary carriers to a plurality of beverage containers.

Referring now to FIGS. 1 and 2, the can-carrying and covering device 21 includes the carrier chain or mechanism 22 passing around the turning sprockets 23 and 24. From an infeed mechanism 25 a plurality of containers 26 move onto the loading fingers 27 from which they are placed into a plurality of pocket plates or trays 28 to be carried along a horizontal run 29 of the conveyor 22, ultimately to be removed by unloading fingers 30 and discharged along a take-off ramp 31. This arrangement is also shown more schematically in FIG. 2, particularly the loading fingers 27 and the unloading fingers 30.

In FIG. 3 there is shown schematically how twenty pocket plates 28 can be assembled on the conveyor chain 22 for movement of the containers 26 through the processing apparatus 21.

Figure 5:
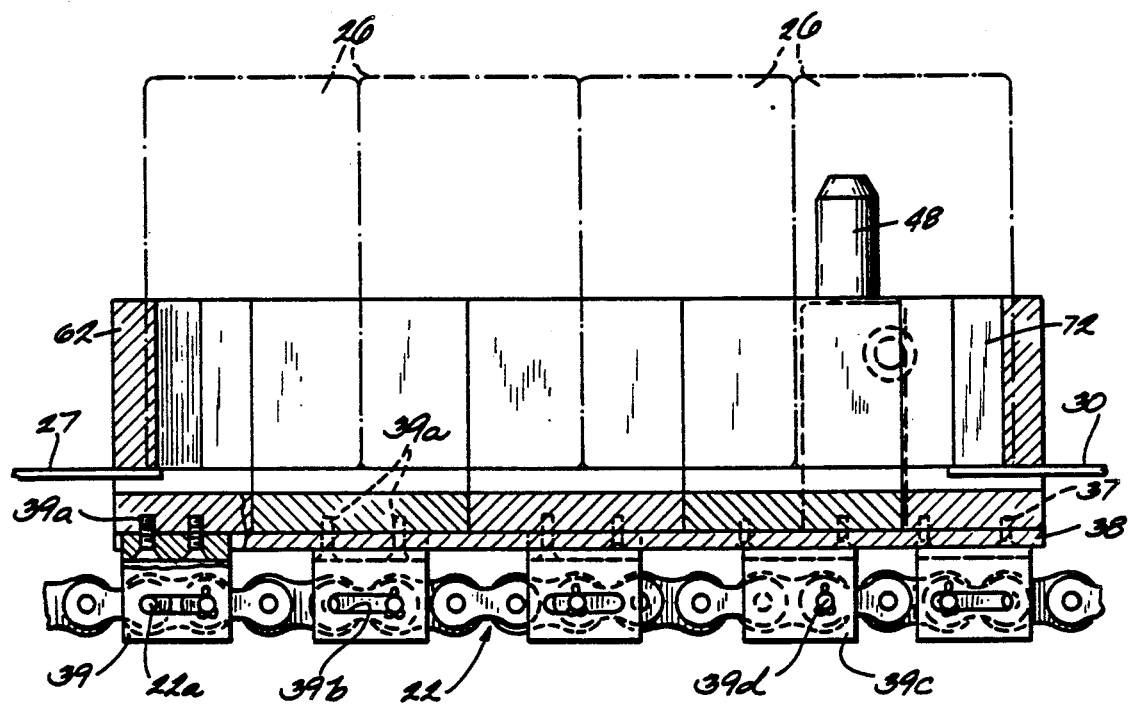
FIG. 5 is a vertical cross-sectional view taken along line 5—5 of FIG. 4.

Referring now particularly to FIGS. 4, 5, and 6, there is shown one of the pocket plates 28 including three central carrier members 32, 33 and 34, and two end-carrier members 35 and 36.

The three central members 32, 33 and 34 are generally U-shaped in cross-section, as shown particularly in FIG. 6, and all five members are mounted as by rivets or similar fastening devices 37 to thin, flexible metal plates 38.

The plates 38 are thin and flexible enough so that they may easily follow the contours and configurations of the chain 22 as it passes through the conveyor system and around the wheels or sprockets 23 and 24 but, at the same time, are rigid and stable so that they securely hold the retaining members 32-36 in positive and predetermined location with respect to each other.

Although I have shown a plurality of plates 38, it is to be understood that a single plate may be used to hold the carrier members in close registration.

To each of the carrier members 32-36 is fastened a pair of supporting blocks 39, as by rivets or the like 39-a. This is shown particularly in FIGS. 5 and 7.

Each of the blocks 39 has apertures to receive therein the shafts, spindles or axles 22-a of the conveyor belt 22. In some of the blocks, as at 39-b, the apertures are slots to permit relative but controlled movement between the blocks 39 and the chain 22. At least one of the blocks, such as 39-c, has holes 39-d, rather than slots, and this insures the precise positioning of the carriers on the chain 22, while permitting relative movement between the chain and the rest of the blocks and associated carrier members.

As can be seen in FIGS. 1, 2 and 3, the pocket plates 28 travel continuously around the loop or configuration defined by the chain 22, and when they turn upwardly and around the roll 23, they come beneath the loading fingers 27 as shown particularly in FIG. 2.

In each of the holding members 32-36, several recesses or grooves 40-a, 40-b and 40-c are formed so that loading fingers 27-a, 27-b and 27-c and unloading fingers 30-a, 30-b and 30-c may rest therein in a manner so that a row of the containers 26 may slide across each finger and onto the bottom of each of the carrier members as the pocket plates travel beneath the fingers.

Each of the end holding members 35 and 36 has corresponding slots 42-a, 42-b and 42-c in the end walls 44 and 45, to permit the passage of the fingers 27-a, 27-b, 27-c, and 30-a, 30-b and 30-c into the grooves 40-a, 40-b, and 40-c.

The horizontal dimensions between the inner vertical surfaces of the end walls 44 and 45 and the inner vertical surfaces of the side walls 46 and 47 of the pocket plate members are selectively dimensioned for the specific containers 26 to be carried by the conveyor system. Additionally, wedge portions 60-63 in the end wall 44 of member 35, and wedge portions 70-73 in the end wall 45 of member 36 press against the round walls of the containers held in the pocket plate 28 so that when the pocket plate assembly is in the horizontal run of the conveyor between the loading fingers 27 and the unloading fingers 30, the array of holding devices 32-36 will be firm and tight. This ensures that the containers 26 are clamped in accurate location and position in the array to be acted upon by subsequent mechanism or processes such as the device for applying a sanitary carrier cover as shown in FIGS. 1 and 2 and as more clearly described in the co-pending application Ser. No. 617,685.

When used in conjunction with a forming or application operation, the pocket plate is fitted with index pins 48 and 49. During the application or forming operation, other operating devices may be moved down toward the pocket plates, and bushings in the moving device slide down over the index pins 48 and 49. This insures accurate orientation of the two mechanisms in both machine and cross-machine directions.

In operation the products are pushed along the infeed or "dead plate" 25, as shown in FIG. 1, as well as along the long loading fingers 27-a,b,c. A pocket plate is moved around the sprocket 23, splaying it into an open configuration, and as the pocket moves up and around the sprocket 23 and onto the horizontal path, it is loaded with products pushed into it across the dead plate 25 and fingers 27.

The slots 42-a,b,c in the end walls of the pocket plates allow the loading fingers 27-a,b,c to enter the pocket plates and move into the grooves 40-a,b,c.

Following the loading of the products into the pocket plates, the rear carrier member 35 of the pocket rotates to a horizontal travel position, clamping the products tightly and precisely within the pocket plate.

After the containers have had further work done upon them by the apparatus 21, the products are transported by the pocket plates horizontally to the unload dead plate 31, where the horizontal stationary unload fingers 30-a,b,c enter the pocket plate through the slots 42-a,b,c to ride in the grooves 40-a,b,c.

When the containers reach the end of the horizontal travel, they are lifted from the pocket plates by the unloading fingers 30-a,b,c as the pocket plate starts to rotate down and away from the unloading fingers 30-a,b,c around the sprocket 24.

Thus I have described a device for holding and transporting a variety of packages in precise orientation for a secondary operation. The series of flat plates, attached to a chain or similar conveyor equivalent, are arranged with vertical edges, to contain the product to be transported. They are held in position with respect to one another by a flexible band mounted on the underside of the plates to form a series of "pocket plates" for transporting the pockets through a process requiring good product registration.

It is to be understood that the present invention may be embodied in other specific forms without departing from the spirit or special attributes hereof, and it is therefore desired that the present embodiments be considered in all respects as illustrative, and therefore not restrictive, reference being made to the appended Claims rather than to the foregoing description to indicate the scope of the invention.

Having thus described my invention, what is claimed as new and desired to be protected by Letters Patent are the following:

1. A device for holding a wide variety of products in accurate location for subsequent operation thereupon, said device including:
   at least one pocket plate having a plurality of holding members;
   each holding member having a side wall,
   two of said holding members having finger-receiving grooves therein,
   at least one loading finger and at least one unloading finger arranged to slide in each groove,
   laterally flexible, axially rigid spring plates secured to each of said holding members, so as to retain said holding members in precise location with respect to each other when said flexible plate is disposed in a single plane, but which permits said holding members to splay open or move away from each other when carried around a circuitous path prior to said loading and after leaving the area of the unloading fingers.

2. A device of claim 1 wherein said flexible plate is metal and is fixedly secured to each of said holding members, and said holding members are secured to a conveyor.

3. A device of claim 2 wherein said conveyor is a chain belt.

4. A device of claim 2 wherein said conveyor is a timing belt.

5. A device of claim 1 wherein said loading and unloading fingers are flexible, metal strips.

6. The device of claim 3 wherein the flexible rigid plate is fastened to a plurality of links in the chain belt and all of the holding members in each pocket plate are fastened to a single, flexible plate.

7. The device of claim 6 wherein the positioning of the holding members is independent of any mechanical wear on the chain belt.

8. The device of claim 1 wherein at least two of the products are in axial alignment within the holding member, and two of the products are in side-by-side alignment within the holding member.

9. The device of claim 8 wherein the holding member presses against the side wall of the products, substantially above the base of the products.

10. The device of claim 9 wherein the clamping pressure against the side wall of the product is applied between 25 to 60% of the height of the product.

11. The device of claim 9 wherein the clamping pressure against the side wall of the product is applied between 40 and 45% of the height of the product.

12. The device of claim 9 wherein the clamping action of the holding member against the side wall provides dimensional integrity in both machine and cross-machine direction.

13. The device of claim 1 including at least one index pin in each pocket plate to insure accurate orientation of the pocket plate with subsequent operating devices.

* * * * *